US008015655B1

(12) United States Patent
Mikolaitis

(10) Patent No.: US 8,015,655 B1
(45) Date of Patent: Sep. 13, 2011

(54) WINDSHIELD WIPER APPARATUS

(76) Inventor: Patrick Mikolaitis, Dallas, PA (US)

( * ) Notice: Subject to any disclaimer, the term of this patent is extended or adjusted under 35 U.S.C. 154(b) by 194 days.

(21) Appl. No.: 12/469,867

(22) Filed: May 21, 2009

(51) Int. Cl.
*B60S 1/28* (2006.01)
*B60S 1/46* (2006.01)

(52) U.S. Cl. ............... 15/250.04; 15/250.41; 15/250.48

(58) Field of Classification Search .............. 15/250.04, 15/250.4, 250.41, 245, 250.48, 250.361
See application file for complete search history.

(56) References Cited

U.S. PATENT DOCUMENTS

| | | | |
|---|---|---|---|
| 3,906,583 A | 9/1975 | Murphy | |
| D257,339 S | 10/1980 | Ellinwood | |
| 4,327,457 A * | 5/1982 | Lunsford | 15/250.03 |
| 5,235,720 A * | 8/1993 | Kinder | 15/250.4 |
| 5,406,672 A | 4/1995 | Hipke | |
| 5,778,483 A | 7/1998 | Dawson | |
| 6,505,378 B1 | 1/2003 | Squires | |
| 7,013,525 B1 * | 3/2006 | Meredith et al. | 15/250.41 |
| 7,093,317 B1 | 8/2006 | Simmer | |
| 2008/0072392 A1 | 3/2008 | Capoano | |

* cited by examiner

*Primary Examiner* — Gary K Graham
(74) *Attorney, Agent, or Firm* — Crossley Patent Law; Mark A. Crossley

(57) ABSTRACT

The windshield wiper apparatus provides superior windshield cleaning and wiping. The spaced apart dual blades provide superior windshield wiping. The pliable scrubber disposed between the blades scrubs debris, bugs, and other undesirable elements from the windshield, and the blades carry it away. The apparatus dispenses liquid to the windshield wiper scrubber. The windshield wiper apparatus uses existing automobile windshield liquid delivery systems to supply the wiper apparatus. The apparatus replaces existing wipers without wiper arm modification due to the mounting flange design.

3 Claims, 3 Drawing Sheets

US 8,015,655 B1

WINDSHIELD WIPER APPARATUS

BACKGROUND OF THE INVENTION

Through the years, various wiper blade designs have superseded others in an ongoing process of improvements. Certainly room remains for wiper improvements still. One inconvenient and sometimes dangerous problem with windshields is the fact that dirt, debris, bugs, snow, ice, and other undesirable elements can accumulate. While existing automobile windshield washing systems are provided, liquid delivery is accomplished via spray onto the windshield. Anyone using such systems is aware of the shortcomings of such a liquid delivery. If no other problem existed, and they do, the fact that liquid sprays cannot function well during auto driving is problematic enough. Add to this the fact that blades are not especially effective in removing undesirable elements, even with liquid present. Dual wiper blades are not new, but do not always function well either. One problem encountered with some dual blades is that fully separated bases with blades result in too much drag against a windshield. This excessive drag can easily destroy a windshield wiper motor.

What has been needed is an effective means for scrubbing and wiping a windshield, even with an automobile moving. The present apparatus provides such a means.

FIELD OF THE INVENTION

The windshield wiper apparatus relates to windshield wipers and more especially to an apparatus that provides dual blades with a liquid fed pliable scrubber therebetween.

SUMMARY OF THE INVENTION

The general purpose of the windshield wiper apparatus, described subsequently in greater detail, is to provide a windshield wiper apparatus which has many novel features that result in an improved windshield wiper apparatus which is not anticipated, rendered obvious, suggested, or even implied by prior art, either alone or in combination thereof.

To attain this, the windshield wiper apparatus provides superior windshield cleaning and wiping. The spaced apart dual blades are mounted on a communal base and provide superior windshield wiping without excessive blade drag. The pliable scrubber disposed between the blades scrubs debris, bugs, and other undesirable elements from the windshield, and the blades carry it away. The apparatus dispenses liquid to the windshield wiper scrubber.

The windshield wiper apparatus uses existing windshield liquid delivery systems to supply the wiper apparatus. The apparatus replaces existing wipers without wiper arm modification due to the mounting flange design.

A more basic embodiment of the apparatus is provided in which the liquid delivery system is negated, and the apparatus makes use of liquid delivered to the windshield by existing automobile liquid delivery systems.

Thus has been broadly outlined the more important features of the improved windshield wiper apparatus so that the detailed description thereof that follows may be better understood and in order that the present contribution to the art may be better appreciated.

An object of the windshield wiper apparatus is to provide superior windshield cleaning and wiping.

A further object of the windshield wiper apparatus is to provide dual blades on the wiper.

Another object of the windshield wiper apparatus is to provide a pliable scrubber for the windshield wiper.

An object of the windshield wiper apparatus is to dispense liquid to the windshield wiper scrubber.

And, an object of the windshield wiper apparatus is to replace existing wipers without wiper arm modification.

Yet another object of the windshield wiper apparatus is to use existing windshield liquid delivery systems to supply the wiper apparatus.

These together with additional objects, features and advantages of the improved windshield wiper apparatus will be readily apparent to those of ordinary skill in the art upon reading the following detailed description of presently preferred, but nonetheless illustrative, embodiments of the improved windshield wiper apparatus when taken in conjunction with the accompanying drawings.

In this respect, before explaining the current embodiments of the improved windshield wiper apparatus in detail, it is to be understood that the windshield wiper apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved windshield wiper apparatus. It is therefore important that the claims be regarded as including such equivalent constructions insofar as they do not depart from the spirit and scope of the windshield wiper apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the windshield wiper apparatus generally designated by the reference number 10 will be described.

Figure 1:
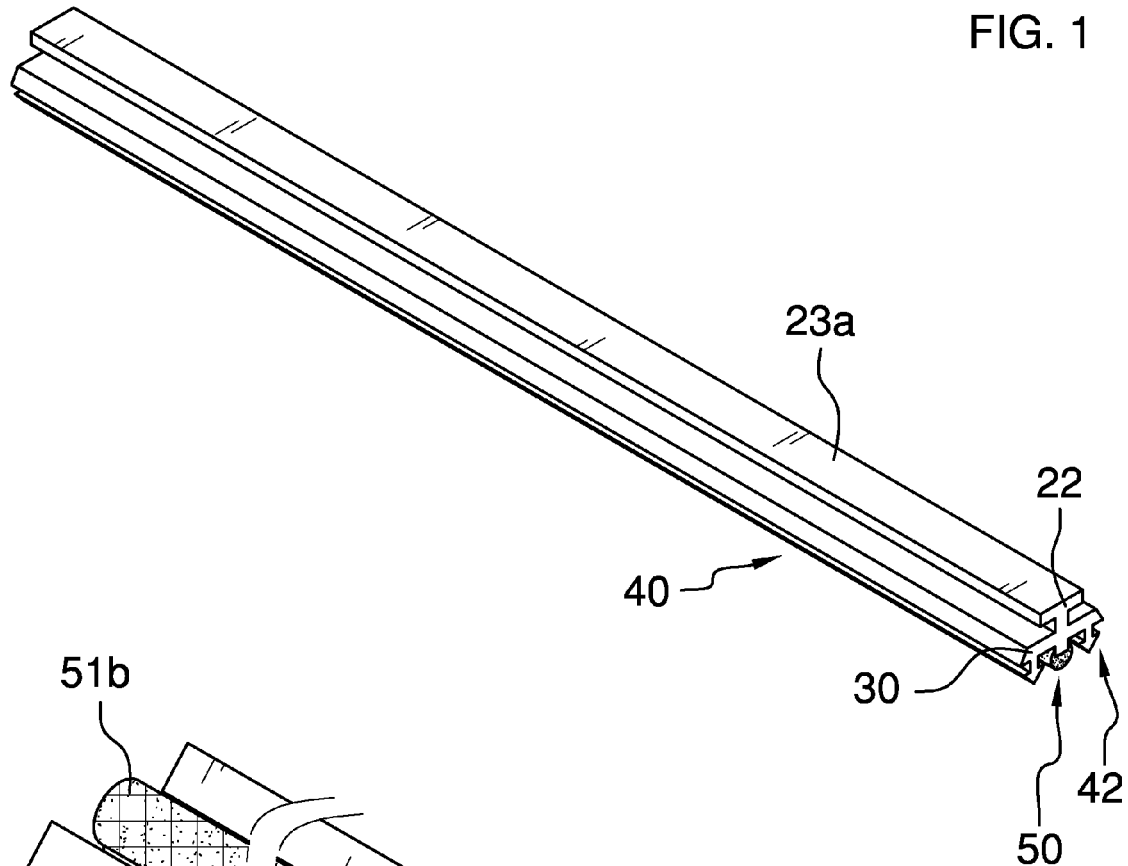
FIG. 1 is a perspective view of the wiper, base up.
Figure 5:
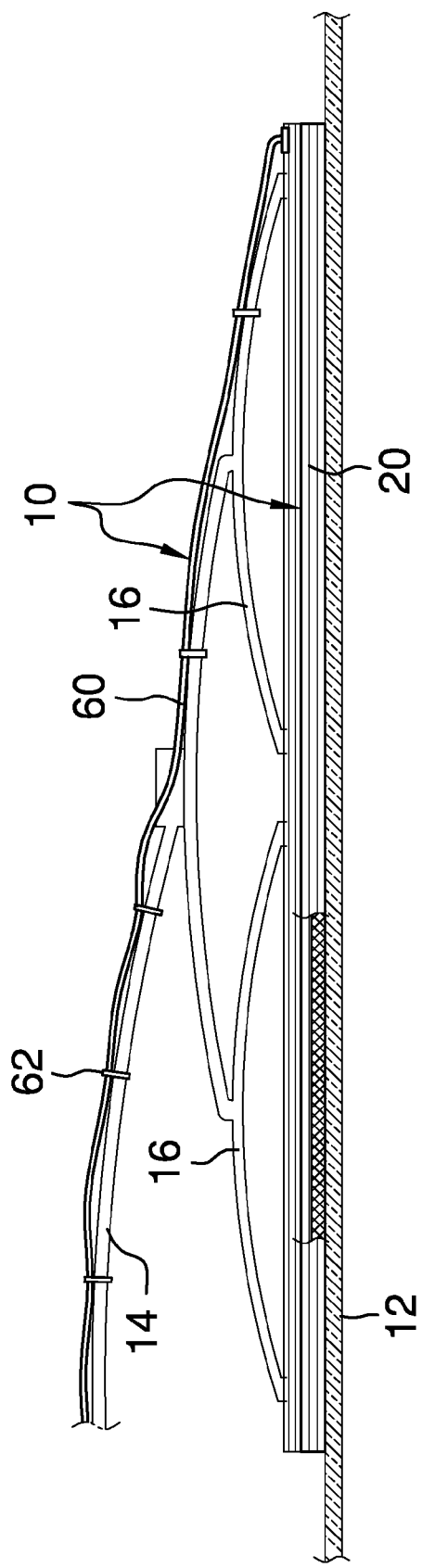
FIG. 5 is a lateral elevation view of the apparatus installed on existing wiper arms of an actuating arm.

Referring to FIGS. 1 and 5, the apparatus 10 partially comprises the flexible wiper 20 that partially comprises the t-shaped mounting flange 22. The mounting flange 22 has a flange top 23*a* spaced apart from a flange bottom 23*b*. The flange top 23*a* is removably fitted to a pair of existing wiper arms 16 of an existing actuating arm 14 of an automobile with windshield 12.

Figure 3:
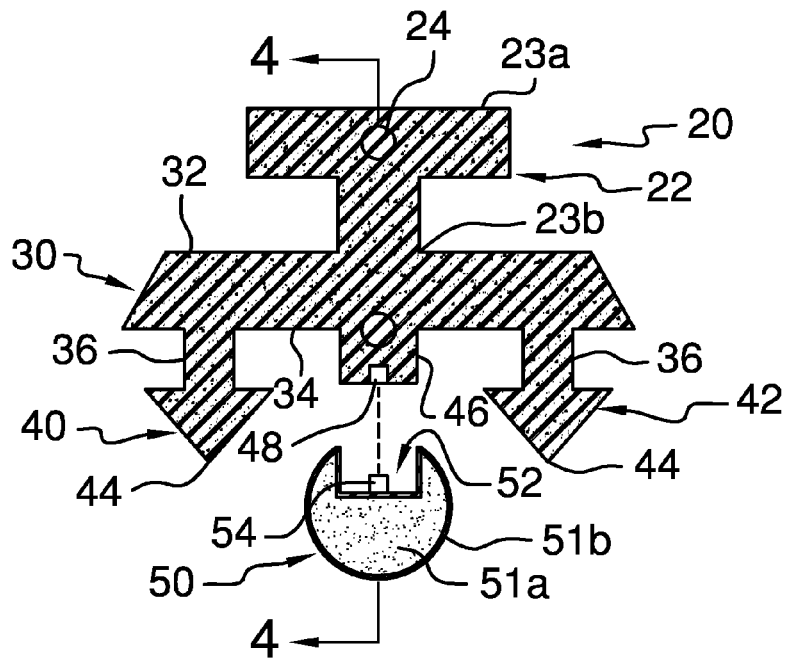
FIG. 3 is a cross sectional view of FIG. 2, taken along the line 3-3.
Figure 4:
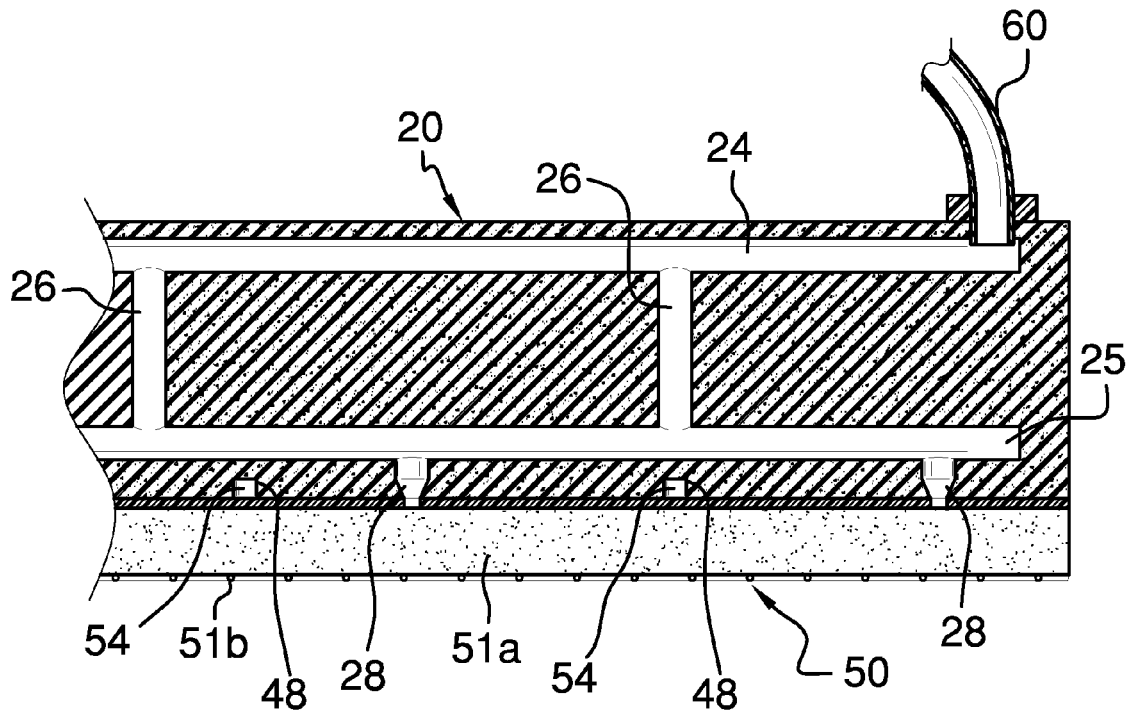
FIG. 4 is a cross sectional view of FIG. 3, taken along the line 4-4.

Referring to FIGS. 3 and 4, the first inner tube 24 is disposed within the length of the mounting flange 22. The first inner tube 24 is most proximal to the flange top 23*a*.

Figure 2:
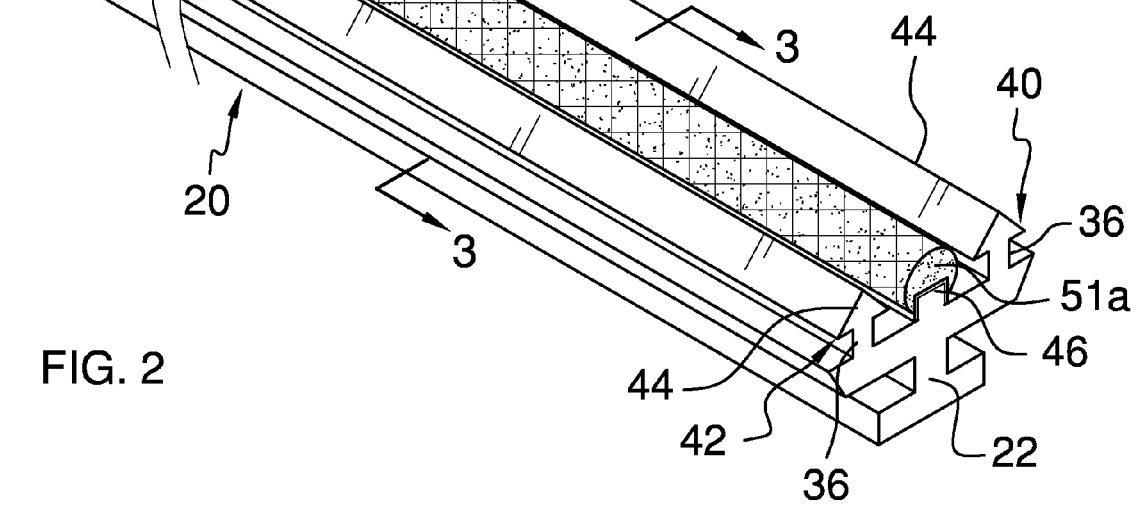
FIG. 2 is a perspective view of the wiper, blades and scrubber up.

Referring again to FIGS. 1, 3, and 4 and also to FIG. 2, the trapezoidal blade base 30 has a base top 32 spaced apart from a base bottom 34. The base bottom 34 has a wider dimension than the base top 32. The base top 32 is affixed to the flange bottom 23*b*. The rectangular center protrusion 46 is extended from the base bottom 34. The plurality of spaced apart notches 48 is disposed within the center of the protrusion 46.

The second inner tube 25 is disposed within the length of the base bottom 34 and the center protrusion 46. The plurality of transfer tubes 26 connects the first inner tube 24 to the second inner tube 25.

Referring again to FIGS. 2 and 4, the pair of identical spaced apart blades comprises the first blade 40 and the second blade 42. Each blade has a blade shaft 36 disposed atop an arrow tip 44. Each blade shaft 36 is affixed perpendicularly to the base bottom 34. The rectangular center protrusion 46 is extended from the base bottom 34. The protrusion 46 is disposed equidistantly between the blades.

Referring again to FIGS. 2, 3, and 4, the substantially cylindrical scrubber 50 is replaceable. The scrubber 50 comprises an inner foam 51a surrounded by a mesh 51b. The scrubber 50 has a plurality of identical cutouts 52 disposed therein. Each cutout 52 has an insert 54 extended therefrom. Each cutout 52 is removably fitted over a base bottom 34 center protrusion 46. Each insert 54 is inserted into a matching center protrusion 46 notch 48.

Referring again to FIGS. 1 and 4, the plurality of identical spaced apart valves 28 is extended from the center protrusion 46. Each valve 28 is supplied by the second inner tube 25. Each valve 28 supplies the scrubber 50 foam 51a with a liquid. The flexible delivery hose 60 is hooked to the actuating arm 14 via a plurality of hose clamps 62. The delivery hose 60 has liquid supplied by an existing liquid delivery system of an automobile. The delivery hose 60 supplies the first inner tube 24.

With respect to the above description then, it is to be realized that the optimum dimensional relationships for the parts of the windshield wiper apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the windshield wiper apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the windshield wiper apparatus may be used.

Therefore, the foregoing is considered as illustrative only of the principles of the windshield wiper apparatus. Further, since numerous modifications and changes will readily occur to those skilled in the art, it is not desired to limit the windshield wiper apparatus to the exact construction and operation shown and described, and accordingly, all suitable modifications and equivalents may be resorted to, falling within the scope of the windshield wiper apparatus.

What is claimed is:

1. A windshield wiper apparatus, comprising, in combination:
   a flexible wiper comprising:
      a t-shaped mounting flange having a flange top spaced apart from a flange bottom, the flange top removably fitted to a pair of existing wiper arms of an existing actuating arm;
      a trapezoidal blade base having a base top spaced apart from a base bottom, the base bottom having a wider dimension than the base top, the base top affixed to the flange bottom;
      rectangular center protrusions extended from the base bottom;
      a plurality of identical spaced apart notches disposed within a center of the protrusions;
      a pair of identical spaced apart blades comprising a first blade and a second blade, each blade having a blade shaft disposed atop an arrow tip, each blade shaft affixed perpendicularly to the base bottom, the center protrusions disposed equidistantly between the blades;
      a substantially cylindrical scrubber comprising an inner foam surrounded by a mesh, the scrubber having a plurality of spaced apart identical cutouts disposed therein, each cutout having an insert extended therefrom, each cutout matching and removably fitted over one of the base bottom center protrusions, each insert matching and inserted into one center protrusion notch.

2. A windshield wiper apparatus, comprising, in combination:
   a flexible wiper comprising:
      a t-shaped mounting flange having a flange top spaced apart from a flange bottom, the flange top removably fitted to a pair of existing wiper arms of an existing actuating arm;
      a trapezoidal blade base having a base top spaced apart from a base bottom, the base bottom having a wider dimension than the base top, the base top affixed to the flange bottom;
      rectangular center protrusions extended from the base bottom;
      a plurality of spaced apart notches disposed within a center of the protrusions;
      a pair of identical spaced apart blades comprising a first blade and a second blade, each blade having a blade shaft disposed atop an arrow tip, each blade shaft affixed perpendicularly to the base bottom, the center protrusions disposed equidistantly between the blades;
      a substantially cylindrical scrubber comprising an inner foam surrounded by a mesh, the scrubber having a plurality of identical spaced apart cutouts disposed therein, each cutout having an insert extended therefrom, each cutout matching and removably fitted over one of the base bottom center protrusions, each insert matching and inserted into one center protrusion notch;
   a flexible delivery hose hooked to the actuating arm via a plurality of hose clamps, the delivery hose having a liquid supplied by an existing liquid delivery system of an automobile;
   means for delivery of the liquid to the scrubber.

3. A windshield wiper apparatus, comprising, in combination:
   a flexible wiper comprising:
      a t-shaped mounting flange having a flange top spaced apart from a flange bottom, the flange top removably fitted to a pair of existing wiper arms of an existing actuating arm;
      a first inner tube disposed within a length of the mounting flange, the first inner tube proximal to the flange top;
      a trapezoidal blade base having a base top spaced apart from a base bottom, the base bottom having a wider dimension than the base top, the base top affixed to the flange bottom;
      rectangular center protrusions extended from the base bottom;

a plurality of spaced apart notches disposed within a center of the protrusions;

a second inner tube disposed within a length of the base bottom and the center protrusions;

a plurality of spaced apart transfer tubes connecting the first inner tube to the second inner tube;

a pair of identical spaced apart blades comprising a first blade and a second blade, each blade having a blade shaft disposed atop an arrow tip, each blade shaft affixed perpendicularly to the base bottom, the center protrusions disposed equidistantly between the blades;

a substantially cylindrical scrubber comprising an inner foam surrounded by a mesh, the scrubber having a plurality of identical spaced apart cutouts disposed therein, each cutout having an insert extended therefrom, each cutout matching and removably fitted over one of the base bottom center protrusions, each insert matching and inserted into one center protrusion notch;

a plurality of identical spaced apart valves extended from the center protrusion, each valve supplied by the second inner tube, each valve supplying the scrubber with a liquid;

a flexible delivery hose hooked to the actuating arm via a plurality of hose clamps, the delivery hose having liquid supplied by an existing liquid delivery system of an automobile, the delivery hose supplying the first inner tube.

* * * * *